US011928089B2

(12) United States Patent
Guo et al.

(10) Patent No.: US 11,928,089 B2
(45) Date of Patent: Mar. 12, 2024

(54) DATA PROCESSING METHOD AND DEVICE FOR DISTRIBUTED DATABASE, STORAGE MEDIUM, AND ELECTRONIC DEVICE

(71) Applicant: ZTE Corporation, Shenzhen (CN)

(72) Inventors: Longbo Guo, Shenzhen (CN); Yan Ding, Shenzhen (CN); Yiliang Xu, Shenzhen (CN); Peng Zhang, Shenzhen (CN); Jiashun Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 892 days.

(21) Appl. No.: 16/754,150

(22) PCT Filed: Nov. 29, 2018

(86) PCT No.: PCT/CN2018/118243
§ 371 (c)(1),
(2) Date: Apr. 5, 2021

(87) PCT Pub. No.: WO2019/109854
PCT Pub. Date: Jun. 13, 2019

(65) Prior Publication Data
US 2022/0229822 A1 Jul. 21, 2022

(30) Foreign Application Priority Data

Dec. 7, 2017 (CN) .......................... 201711287703.7

(51) Int. Cl.
*G06F 16/21* (2019.01)
*G06F 11/14* (2006.01)
(Continued)

(52) U.S. Cl.
CPC ........ *G06F 16/214* (2019.01); *G06F 11/1469* (2013.01); *G06F 16/2365* (2019.01); *G06F 16/25* (2019.01)

(58) Field of Classification Search
CPC .... G06F 16/214; G06F 16/25; G06F 16/2365; G06F 11/1469
(Continued)

(56) References Cited

U.S. PATENT DOCUMENTS 6,240,428 B1 * 5/2001 Yeung ................... G06F 16/217
6,266,698 B1 7/2001 Klein
(Continued)

FOREIGN PATENT DOCUMENTS

CN 104572895 A 4/2015
CN 106557514 A 4/2017
(Continued)

OTHER PUBLICATIONS

Kang, Hyunchul, et al., "A Hierarchical Export/Import Scheme for Data Sharing in a Federated Distributed Database", Database Systems for Advanced Applications '91, @ World Scientific Publishing Co., Apr. 1991, pp. 31-40.*
(Continued)

*Primary Examiner* — Robert Stevens
(74) *Attorney, Agent, or Firm* — CANTOR COLBURN LLP

(57) ABSTRACT

A data processing method includes: after receiving an export request for exporting data from the distributed database, acquiring, by a database import and export management node an active transaction list and export table distribution information at a current moment; notifying, by the database import and export management node, a corresponding database that the corresponding database performs a data export operation according to the export table distribution information; after determining that the corresponding database completes the data export operation, sending, by the database import and export management node, the active transaction list to a database agent node of the corresponding
(Continued)

database; and after receiving a data consistency reverse compensation statement returned by the database agent node, importing, by the database import and export management node, the data exported by the corresponding database into a predetermined database and instructing the predetermined database to execute the data consistency reverse compensation statement.

16 Claims, 7 Drawing Sheets

(51) Int. Cl.
  *G06F 16/23* (2019.01)
  *G06F 16/25* (2019.01)
(58) Field of Classification Search
  USPC .......................................................... 707/609
  See application file for complete search history.

(56) References Cited

U.S. PATENT DOCUMENTS

| | | | | |
|---|---|---|---|---|
| 7,610,314 | B2* | 10/2009 | Souder | G06F 16/27 |
| 2002/0023129 | A1* | 2/2002 | Hsiao | G06F 9/466 |
| | | | | 714/E11.131 |
| 2005/0055351 | A1* | 3/2005 | Barton | G06F 16/23 |
| 2007/0083563 | A1* | 4/2007 | Souder | G06F 16/27 |
| 2010/0191884 | A1 | 7/2010 | Holenstein | |
| 2011/0289050 | A1 | 11/2011 | McCarthy | |
| 2016/0147809 | A1* | 5/2016 | Schreter | G06F 11/1446 |
| | | | | 707/746 |
| 2017/0228290 | A1* | 8/2017 | Maccanti | G06F 11/1469 |
| 2017/0228417 | A1* | 8/2017 | Maccanti | G06F 11/1464 |
| 2018/0096001 | A1* | 4/2018 | Soza | G06F 16/235 |
| 2018/0189328 | A1* | 7/2018 | Frazier | G06F 16/254 |

FOREIGN PATENT DOCUMENTS

| | | | |
|---|---|---|---|
| CN | 106610876 | A | 5/2017 |
| CN | 107436799 | A | 12/2017 |

OTHER PUBLICATIONS

Breitbart, Yuri, et al., "Overview of Multidatabase Transaction Management", CASCON '10, Toronto, Ontario, Canada, Nov. 2010, pp. 93-126.*
Microsoft Computer Dictionary, 5th Edition, Microsoft Press, Redmond, WA, @ 2002, pp. 141 and 474.*
Hueni, A., et al., "Data exchange between distributed spectra databases", Computers & Geosciences, vol. 37, Issue 7, Jul. 2011, pp. 861-873.*
Koponen, Teemu, et al., "Onix: A Distributed Control Platform for Large-scale Production Networks", OSDI '10, Vancouver, BC, Canada, Oct. 4-6, 2010, 14 pages.*
International Search Report for corresponding application PCT/CN2018/118243 filed Nov. 29, 2018; dated Feb. 27, 2019.
Chinese Office Action for corresponding application 201711287703; Report dated Apr. 27, 2021, 10 pages.
Chinese Search Report for corresponding application 201711287703; Report dated Apr. 27, 2021, 5 pages.
European Search Report for corresponding application EP18886794; Report dated Jul. 9, 2021, 8 pages.

* cited by examiner

DATA PROCESSING METHOD AND DEVICE FOR DISTRIBUTED DATABASE, STORAGE MEDIUM, AND ELECTRONIC DEVICE

CROSS-REFERENCE TO RELATED APPLICATION

The present application is a national stage application under 35 U.S.C. 371 based on international patent application PCT/CN2018/118243, filed on Nov. 29, 2018 which claims the priority of Chinese patent application No. 201711287703.7 filed on Dec. 7, 2017, the contents of both of which are incorporated in the present application by reference in their entireties.

TECHNICAL FIELD

The present disclosure relates to the field of communications and, in particular, to a data processing method and device for a distributed database, a storage medium and an electronic device.

BACKGROUND

In the related art, there are mainly two data export methods for a distributed database: one is combining single node data into a piece of data after the single node data is exported, and the other is selecting data from a distributed database agent, redirecting the data and outputting the redirected data to a data file. However, an export from the distributed database under these mechanisms has obvious defects and limitations.

Currently, a most common data export scheme for the distributed database is described below. Firstly, a database agent is notified that a data export job is to be done, and the database agent is requested not to receive a new transaction and wait for a current active transaction to be completed. After an online disable success of the distributed database is returned, the database agent begins to initiate a data export task to each database node. After the task begins to be performed, that is, after a consistency snapshot of export statements is obtained, the database agent terminates the disable and begins to process the new transaction.

Since the distributed database involves a large number of database instances, each database instance guarantees atomic, consistency, isolation and durability (ACID) properties of data transactions individually, but the distributed database is also faced with a data export problem different from a standalone, that is, distributed transaction data consistency. The distributed transaction data consistency means that all of distributed transactions initiated by the distributed database agent are either executed and submitted successfully, or not executed (that is, in a state before execution). Taking bank transfer as an example, assuming that data related to a user A is stored in a database node G1, data related to a user B is stored in a node G2, and now 100 yuan is needed to be transferred from an account A to the user B, the distributed transaction consistency means that a deduction from the account of the user A at the node G1 and a transfer into an account of the user B at the node G2 need to be logically bound as one operation, which can only be successfully executed or not executed.

A key challenge for a distributed data export is how to ensure data consistency of database nodes. In an execution process of the distributed database, different numbers of statements for the distributed transactions are distributed to nodes, and different nodes execute the statements at different speeds, so that the distributed transactions are in different states at the database nodes (submitted and un-submitted). If the data export is performed at this time, data inconsistency is caused. In an offline data export scheme, since the database agent has to be prohibited to provide an external service, a method for artificially ensuring the data consistency of the database nodes is not a mainstream mode in the industry, and has large influence on an online business. The distributed data export in the related art has obvious limitations of too long a data export process, too complicated logical processing of the database agent and too many abnormal processes, which is not conducive to operation and maintenance of the distributed database. The distributed data export does not support a long transaction scenario, a long transaction will have large influence on a field business, and usability of the distributed data export is close to that of an offline data export. A selection command is executed by a single node database, a result set is returned to the database agent, and the database agent writes the data into a file, which significantly occupies a network I/O between the database agent and the database and occupies database agent system resources, thereby severely affecting performance of the distributed database.

No effective solution has been provided to solve the problem in the related art of data inconsistency of databases when data is exported from the distributed database.

SUMMARY

The embodiments of the present disclosure provide a data processing method and device for a distributed database, a storage medium and an electronic device, to solve at least the problem in the related art of data inconstancy of databases when data is exported from the distributed database.

An embodiment of the present disclosure provides a data processing method for a distributed database. The data processing method includes steps described below. After receiving an export request for exporting data from the distributed database, a database import and export management node acquires an active transaction list and export table distribution information at a current moment. The active transaction list is used for identifying a completion degree of a current data import and export operation, and the export table distribution information is used for identifying a database that needs to export the data. The database import and export management node notifies, according to the export table distribution information, the corresponding database that the corresponding database performs a data export operation. After determining that the corresponding database completes the data export operation, the database import and export management node sends the active transaction list to a database agent node of the corresponding database to instruct the database agent node to generate a data consistency reverse compensation statement according to the active transaction list and a current log of the corresponding database. After receiving the data consistency reverse compensation statement returned by the database agent node, the database import and export management node imports the data exported by the corresponding database into a predetermined database and instructs the predetermined database to execute the data consistency reverse compensation statement.

Another embodiment of the present disclosure provides a data processing device for a distributed database. The data processing device is applied to a database import and export management node and includes an acquisition module, a notification module, a sending module and an import module. The acquisition module is configured to: after an export request for exporting data from the distributed database is received, acquire an active transaction list and export table distribution information at a current moment. The active transaction list is used for identifying a completion degree of a current data import and export operation, and the export table distribution information is used for identifying a database that needs to export the data. The notification module is configured to notify, according to the export table distribution information, the corresponding database that the corresponding database performs a data export operation. The sending module is configured to: after determining that the corresponding database completes the data export operation, send the active transaction list to a database agent node of the corresponding database to instruct the database agent node to generate a data consistency reverse compensation statement according to the active transaction list and a current log of the corresponding database. The import module is configured to: after the data consistency reverse compensation statement returned by the database agent node is received, import the data exported by the corresponding database into a predetermined database and instruct the predetermined database to execute the data consistency reverse compensation statement.

An optional embodiment further provides a database import and export management node which includes a processor. The processor is configured to perform operations described below. After an export request for exporting data from the distributed database is received, the processor acquires an active transaction list and export table distribution information at a current moment. The active transaction list is used for identifying a completion degree of a current data import and export operation, and the export table distribution information is used for identifying a database that needs to export the data. The processor notifies, according to the export table distribution information, the corresponding database that the corresponding database performs a data export operation. After determining that the corresponding database completes the data export operation, the processor sends the active transaction list to a database agent node of the corresponding database to instruct the database agent node to generate a data consistency reverse compensation statement according to the active transaction list and a current log of the corresponding database. After the data consistency reverse compensation statement returned by the database agent node is received, the processor imports the data exported by the corresponding database into a predetermined database and instruct the predetermined database to execute the data consistency reverse compensation statement.

Another embodiment of the present disclosure further provides a storage medium, which is configured to store programs, where when executed, the programs are configured to execute the method according to any one of the embodiments described above.

Another embodiment of the present disclosure further provides an electronic device, including a memory, a processor and computer programs stored in the memory and executable by the processor, where the processor is configured to execute the computer programs for executing the method according to any one of the embodiments described above.

According to the embodiments of the present disclosure, after the database completes the data export operation, the database import and export management node notifies the active transaction list to the database agent node of the database to instruct the database agent node to generate the data consistency reverse compensation statement according to the active transaction list and the current log of the corresponding database, thereby determining an executed action and an unexecuted action in the data import and export operation, and ensuring data import and export consistency according to the data consistency reverse compensation statement in a subsequent data import. Compared with the related art, the embodiments of the present disclosure can solve at least the problem in the related art of the data inconsistency of databases when the data is exported from the distributed database, thereby ensuring consistency of an online data export distributed transactions of the distributed database and further improving maintainability and usability of the distributed database.

BRIEF DESCRIPTION OF DRAWINGS

The drawings described herein are used to provide a further understanding of the present disclosure and form a part of the present application. The exemplary embodiments and descriptions thereof in the present disclosure are used to explain the present disclosure and not to limit the present disclosure in any improper way. In the drawings.

DETAILED DESCRIPTION

The present disclosure will be described hereinafter in detail with reference to the drawings in conjunction with embodiments. It is to be noted that if not in collision, the embodiments and features therein in the present application may be combined with each other.

It is to be noted that the terms "first", "second" and the like in the description, claims and drawings of the present disclosure are used to distinguish between similar objects and are not necessarily used to describe a particular order or sequence.

The embodiments of the present disclosure aim at defects and limitations of current data export technologies for the distributed database in the industry, and provide a new data export method for the distributed database to ensure consistency of distributed transactions and further improve usability and data reliability of a distributed database system.

Figure 1:
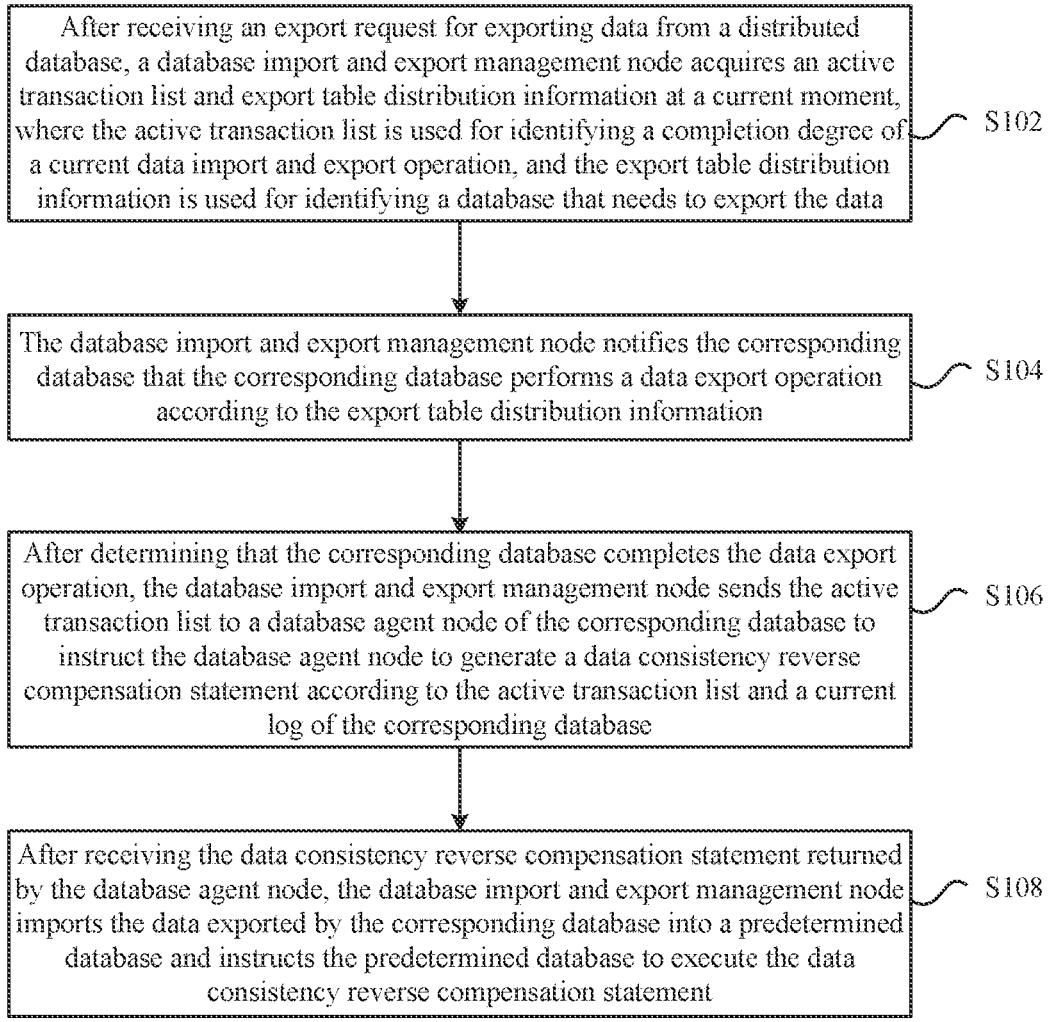
FIG. 1 is a flowchart of a processing method for a distributed database according to an embodiment of the present disclosure.

FIG. 1 is a flowchart of a processing method for a distributed database according to an embodiment of the present disclosure. As shown in FIG. 1, the method includes steps described below.

In step S102, after receiving an export request for exporting data from the distributed database, a database import and export management node acquires an active transaction list and export table distribution information at a current moment, where the active transaction list is used for identifying a completion degree of a current data import and export operation, and the export table distribution information is used for identifying a database that needs to export the data.

In step S104, the database import and export management node notifies, according to the export table distribution information, the corresponding database that the corresponding database performs a data export operation.

In step S106, after determining that the corresponding database completes the data export operation, the database import and export management node sends the active transaction list to a database agent node of the corresponding database to instruct the database agent node to generate a data consistency reverse compensation statement according to the active transaction list and a current log of the corresponding database.

In step S108, after receiving the data consistency reverse compensation statement returned by the database agent node, the database import and export management node imports the data exported by the corresponding database into a predetermined database and instructs the predetermined database to execute the data consistency reverse compensation statement.

In the above-mentioned embodiment, the data consistency reverse compensation statement is a statement for performing reverse compensation to ensure consistency of data in different databases, whose specific form is not limited. A reverse compensation statement in the existing art may be adopted, or the data consistency reverse compensation statement may also be configured according to practical situations.

Through the above-mentioned embodiment, after the database completes the data export operation, the database import and export management node notifies the active transaction list to the database agent node of the database to instruct the database agent node to generate the data consistency reverse compensation statement according to the active transaction list and the current log of the corresponding database, thereby determining an executed action and an unexecuted action in the data import and export operation, and ensuring data import and export consistency according to the data consistency reverse compensation statement in a subsequent data import. Compared with the related art, the embodiments of the present disclosure can solve at least the problem in the related art of data inconsistency of databases when data is exported from the distributed database, thereby ensuring consistency of distributed transactions in an online data export of the distributed database and further improving maintainability and usability of the distributed database. That is to say, with the data processing method for the distributed database provided by this embodiment, an online business of the distributed database may not necessarily be interrupted, transaction inconsistency of database nodes in the case of the distributed transactions does not need to be worried, no large influence on performance of the distributed database will be caused, and a data export from a master node or a spare node can be flexibly configured.

In an optional embodiment, after the database import and export management node notifies, according to the export table distribution information, the corresponding database that the corresponding database performs the data export operation, the method further includes that the database import and export management node stores the data exported by the corresponding database in a predetermined position. The predetermined position includes at least one of: the corresponding database or a server where the database import and export management node is located. In this embodiment, when the exported data is stored in the corresponding database, the data may be stored alone, that is, the data exported from the corresponding database is still stored in the corresponding database. Similarly, when the exported data is stored in the server where the database import and export management node is located, the exported data may also be stored alone.

In an optional embodiment, the step in which the database import and export management node stores the data exported by the corresponding database in the server where the database import and export management node is located includes steps described below. The database import and export management node combines the exported data to obtain first combined data. The database import and export management node stores the first combined data in the server where the database import and export management node is located. In this embodiment, when the exported data needs to be stored in the server where the database import and export management node is located, the exported data may be combined and the combined data may be stored in the server.

In an optional embodiment, after the database import and export management node receives the data consistency reverse compensation statement returned by the database agent node, the method further includes that the database import and export management node stores the data consistency reverse compensation statement in the predetermined position. The predetermined position includes at least one of: the corresponding database or the server where the database import and export management node is located. In this embodiment, when the data consistency reverse compensation statement is stored in the corresponding database, the data consistency reverse compensation statement may be stored alone, that is, the data consistency reverse compensation statement generated by the database agent node of the corresponding database is separately stored in the corresponding database. Similarly, when the data consistency reverse compensation statement is stored in the server where the database import and export management node is located, the data consistency reverse compensation statements may also be stored alone.

In an optional embodiment, the step in which the database import and export management node stores the data consistency reverse compensation statement in the server where the database import and export management node is located includes steps described below. The database import and export management node combines the data consistency reverse compensation statement to obtain second combined data. The database import and export management node stores the second combined data in the server where the database import and export management node is located. In this embodiment, when the data consistency reverse compensation statement needs to be stored in the server where the database import and export management node is located, the data consistency reverse compensation statement may be combined and the combined data may be stored in the server.

It is to be noted that a position of the database import and export management node may be configured flexibly. The database import and export management node may be disposed at a position where it is capable of interacting directly with the database (or a database agent), or may also be disposed at a position where it needs to interact with the database (or the database agent) through a cluster manager. In an optional embodiment, the step in which the database import and export management node notifies, according to the export table distribution information, the corresponding database that the corresponding database performs the data export operation includes that the database import and export management node sends a data export message to the cluster manger according to the export table distribution information to instruct the cluster manger to notify the corresponding database that the corresponding database performs the data export operation. In this embodiment, when the cluster manger notifies the corresponding database that the corresponding database performs the data export operation, the database may be controlled by the database agent of the database to perform the data export operation.

Similarly, in another optional embodiment, the step in which the database import and export management node sends the active transaction list to the database agent node of the corresponding database includes that the database import and export management node sends the active transaction list to the database agent node of the corresponding database through the cluster manager.

The present disclosure will be described below in conjunction with specific embodiments.

The modules that may be used in the embodiments of the present disclosure are described below.

A unified client of the distributed database (e.g., DBTool) is a maintenance tool for the distributed database and is able to send a maintenance command or an execution command to a specific service to be executed.

A database import and export management node (e.g., LoadServer) receives an import and export command sent by the unified client, executes the import and export command, monitor a whole import and export process, and feeds a result back to the client.

A global transaction management node (e.g., global transaction manager (GTM)) generates a global transaction identifier (ID) and manages an active transaction, and provides an interface for querying the active transaction.

A metadata management node of the distributed database (e.g., meta data server) manages a distributed metadata definition, specifically including a table definition, table distribution information, etc.

A cluster manger receives a cluster-related request of an upper layer business, manages a distributed cluster, and transfers the import and export command to each database agent node.

A database (DB) agent is generally an upper layer agent of a database, and is a local database monitoring program that performs complex operations on the database in response to an upper layer request.

The database (DB) is a base node for storing data and executing a structured query language (SQL) statement.

A proxy of the distribute database is an external unified interface of a distributed database business, supports a MySQL client, Java database connectivity (JDBC), open database connectivity (ODBC) and the like, and supports standard SQL.

The above-mentioned embodiments are described below in conjunction with the above-mentioned modules.

When a data export and migration business is needed, the database import and export management node may be notified by the unified client of the distributed database, and the database import and export management node may control a whole data export and migration process. The database import and export management node may acquire an active transaction list at a current moment from the global transaction management node and store the active transaction list. After acquiring the active transaction list, the database import and export management node may acquire current export table distribution information from the metadata management node of the distributed database. After acquiring the export table distribution information, the database import and export management node notifies a data export message to the cluster manger, and the cluster manger distributes an export command to each database agent related to this export according to the data export message.

After receiving the export command, the database agent sends the export command to a corresponding database to be executed and monitors an execution process. After each node (that is, each database) completes the data export, the database import and export management node continues to send the active transaction list to the cluster manger and distribute the active transaction list to each database agent node through the cluster manager.

After receiving the active transaction list, each database agent generates a data consistency reverse compensation statement in conjunction with a current binary log of the database and stores the data consistency reverse compensation statement.

The database import and export management node may determine a storage position of the exported data and/or a storage position of the data consistency reverse compensation statement according to user configurations, which includes at least one of manners described below. (1) The exported data and/or the data consistency reverse compensation statement are stored in the database. (2) The exported data and/or the data consistency reverse compensation statement are stored in the server where the database import and export management node is located. (3) The exported data is combined and/or the data consistency reverse compensation statement is combined, and the combined exported data and/or the combined data consistency reverse compensation statement are stored in the server where the database import and export management node is located.

Figure 2:
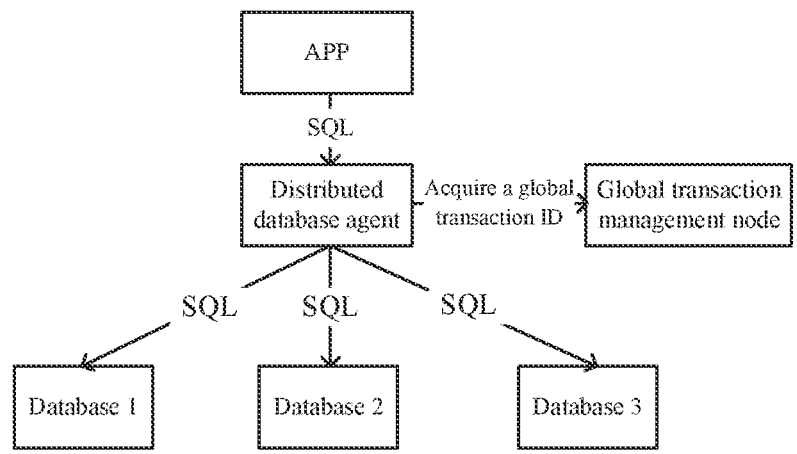
FIG. 2 is an architectural diagram of a distributed database according to an embodiment of the present disclosure.

After the data export operation is completed, data import processing needs to be performed. In the embodiment of the present disclosure, a consistency data import is adopted, that is, the database import and export management node or a single data service imports the exported data into the distributed database, and the consistency reverse compensation statement is executed by the proxy of the distributed database or the single database service, thereby ensuring data consistency of a migration table before and after the export and the import. Architecture of the distributed database may refer to FIG. 2.

According to the above-mentioned embodiment, in the embodiment of the present disclosure, the data consistency is mainly achieved through four steps described below.

In the first step, after receiving a data export request, the database import and export management node queries the active transaction list and export table definition information, and sends the data export request to each database node (that is, the corresponding database described above) through the cluster manager. Since information of each database node is stored in the cluster manager, the method supports an export from the spare machine.

In the second step, when data is exported without interrupting the business, due to network limitations, a different number of statements executed by each node, and a different practical environment of each node, the distributed transactions are in different states when the command is received by each node (for example, a database node 1 has submitted its transaction and a database node 2 has not submitted its transaction). At this time, if a multi-version concurrency control (MVCC) snapshot of a single node database is acquired when data is exported from the database, the distributed transactions are inconsistent. Only when the active transactions are reversely compensated to return to their initial states, each node can export the data based on the consistent distributed transactions.

Figure 3:
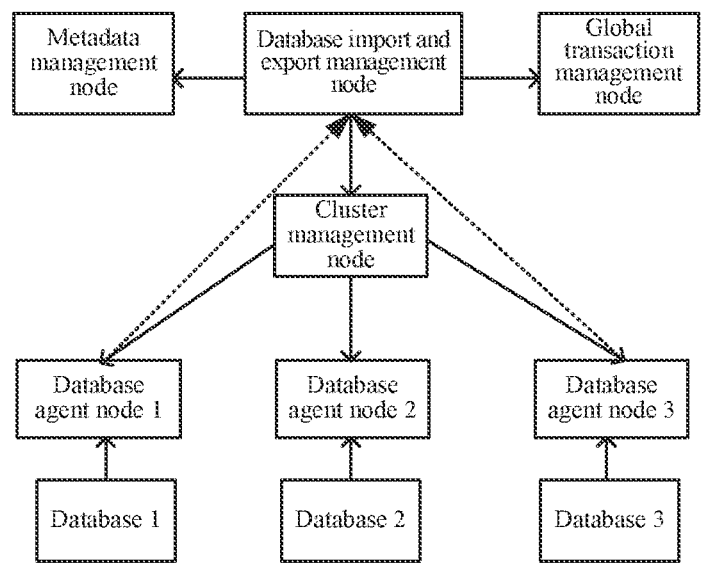
FIG. 3 is an architectural diagram of a data export according to an embodiment of the present disclosure.

In the third step, after each node completes the data export, the database import and export management node sends a request for generating an active transaction reverse compensation statement to each database agent through the cluster manger, where an architectural diagram of the data export may refer to FIG. 3.

In the fourth step, after the data import is completed, the active transactions are reversely compensated, ensuring consistency of the distributed transactions of the data.

From the description of the above-mentioned embodiments, it will be apparent to those skilled in the art that the method in the embodiments described above may be implemented by software plus a necessary general-purpose hardware platform, or may of course be implemented by hardware. However, in many cases, the former is a preferred implementation manner. Based on this understanding, the solutions provided in the present disclosure substantially or the part contributing to the existing art may be embodied in the form of a software product. The computer software product is stored in a storage medium (such as a read-only memory (ROM)/random access memory (RAM), a magnetic disk or an optical disk) and includes several instructions for enabling a terminal apparatus (which may be a mobile phone, a computer, a server, a network apparatus or the like) to execute the methods according to the embodiments of the present disclosure.

This embodiment further provides a data processing device for a distributed database. The device is used for implementing the embodiments described above and preferred embodiments.

What has been described will not be repeated. As used below, the term "module" may be software, hardware or a combination thereof capable of implementing predetermined functions. The device in the embodiment described below is preferably implemented by software, but implementation by hardware or by a combination of software and hardware is also possible and conceived.

Figure 4:
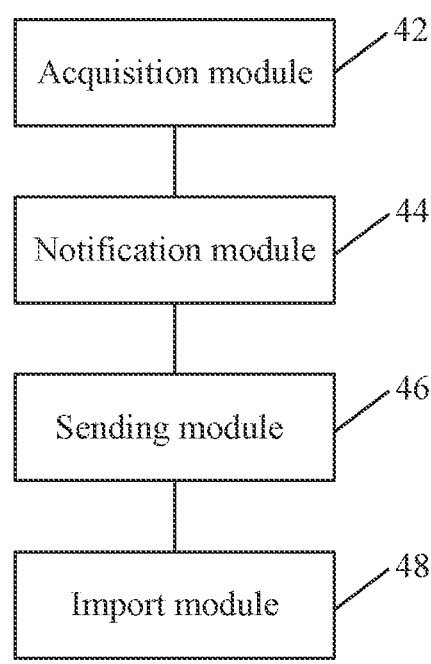
FIG. 4 is a block diagram of a data processing device for a distributed database according to an embodiment of the present disclosure.

FIG. 4 is a block diagram of a data processing device for a distributed database according to an embodiment of the present disclosure. The device may be applied to a database import and export management node. As shown in FIG. 4, the device includes an acquisition module 42, a notification module 44, a sending module 46 and an import module 48. The acquisition module 42 is configured to acquire an active transaction list and export table distribution information at a current moment after an export request for exporting data from the distributed database is received. The active transaction list is used for identifying a completion degree of a current data import and export operation, and the export table distribution information is used for identifying a database that needs to export the data. The notification module 44 is connected to the acquisition module 42 and configured to notify, according to the export table distribution information, the corresponding database that the corresponding database performs a data export operation. The sending module 46 is connected to the notification module 44 and configured to, after determining that the corresponding database completes the data export operation, send the active transaction list to a database agent node of the corresponding database to instruct the database agent node to generate a data consistency reverse compensation statement according to the active transaction list and a current log of the corresponding database. The import module 48 is connected to the sending module 46 and configured to import the data exported by the corresponding database into a predetermined database and instruct the predetermined database to execute the data consistency reverse compensation statement after the data consistency reverse compensation statement returned by the database agent node is received.

In an optional embodiment, the device further includes a first storage module. The first storage module is configured to store the data exported by the corresponding database in a predetermined position after the notification module notifies, according to the export table distribution information, the corresponding database that the corresponding database performs the data export operation. The predetermined position includes at least one of: the corresponding database or a server where the database import and export management node is located.

In an optional embodiment, the first storage module may store the data exported by the corresponding database in the server where the database import and export management node is located in a manner described below. The first storage module combines the exported data to obtain first combined data, and stores the first combined data in the server where the database import and export management node is located.

In an optional embodiment, the device further includes a second storage module. The second storage module is configured to store the data consistency reverse compensation statement in the predetermined position after the data consistency reverse compensation statement returned by the database agent node is received. The predetermined position includes at least one of: the corresponding database or the server where the database import and export management node is located.

In an optional embodiment, the second storage module may store the data consistency reverse compensation statement in the server where the database import and export management node is located in a manner described below. The second storage module combines the data consistency reverse compensation statement to obtain second combined data, and stores the second combined data in the server where the database import and export management node is located.

In an optional embodiment, the notification module 44 may notify the corresponding database that the corresponding database performs the data export operation in a manner described below. The notification module 44 sends a data export message to a cluster manager according to the export table distribution information to instruct the cluster manager to notify the corresponding database that the corresponding database performs the data export operation.

Optionally, the sending module 46 may send the active transaction list to the database agent node of the corresponding database in a manner described below. The sending module 46 sends the active transaction list to the database agent node of the corresponding database through the cluster manager.

The present disclosure is described below in conjunction with specific embodiments.

Specific Embodiment One

Figure 5:
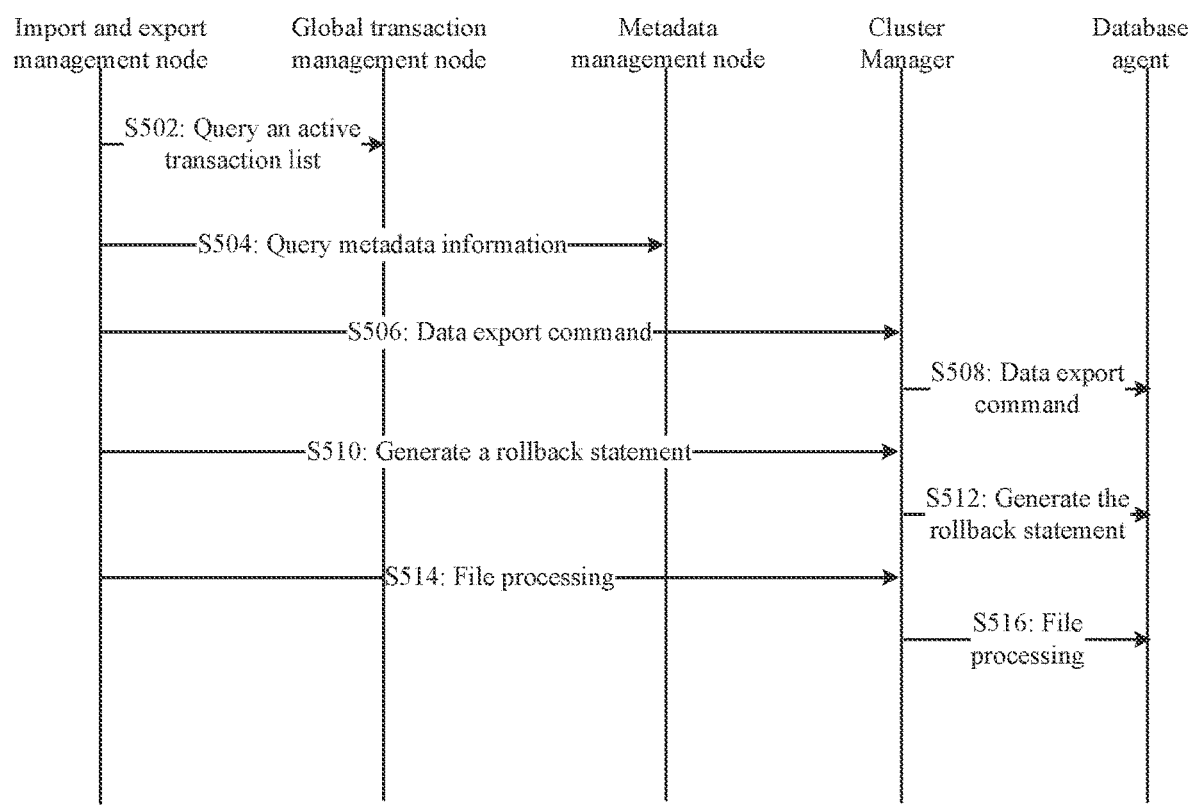
FIG. 5 is a timing diagram of a data export according to a specific embodiment one of the present disclosure.

FIG. 5 is a timing diagram of a data export according to a specific embodiment one of the present disclosure. As shown in FIG. 5, steps are described below.

In step S502, after receiving a data export request, a data import and export management node needs to query information on an active transaction list from a global transaction management node.

In step S504, after receiving a success response returned by the global transaction management node, the data import and export management node needs to request metadata information of an export table from a metadata management node.

In step S506, after receiving a success response returned by the metadata management node, the data import and export management node begins to send an export command to a cluster manager according to a specified export rule.

In step S508, after receiving the data export request, the cluster manager sends the export command to a related database agent node according to the export rule sent by the data import and export management node. After receiving the export command, the database agent node pushes the command to a database for execution.

In step S510, after receiving an execution success result of the export command from the cluster manager, the data import and export management node pushes the active transaction list to the cluster manager (corresponding to requesting the cluster manager to generate a rollback statement in FIG. 5, that is, to generate an active transaction reverse compensation SQL statement corresponding to the data consistency reverse compensation statement described above).

In step S512, the cluster manager pushes the received active transaction list to all the related database agent nodes, and the database agent nodes generate the active transaction reverse compensation SQL statement for each transaction according to the received active transaction list and a binary log file generated by the data.

In step S514, after receiving a response that the reverse compensation SQL statements are successfully generated for the active transaction list returned by the cluster manager, the data import and export management node executes subsequent commands according to a specified export parameter; if a file is stored in a database node, an export task ends and a result is returned; if the file needs to be uploaded to a database import and export management node or to be uploaded to the database import and export management node and combined, a file upload request is issued to a database cluster manager.

In step S516, the cluster manager pushes a received data file upload request to the related database agent nodes, the database agent nodes upload the required data file and an active transaction reverse SQL file to a server where the database import and export management node is located. After receiving a file upload success response, the database import and export management node determines whether the files need to be combined. If the files need to be combined, the files uploaded by the nodes are classified and combined, and after the files are combined, the export task ends and a result is returned. If the files do not need to be combined, the task ends and the result is directly returned.

Specific Embodiment Two

Figure 6:
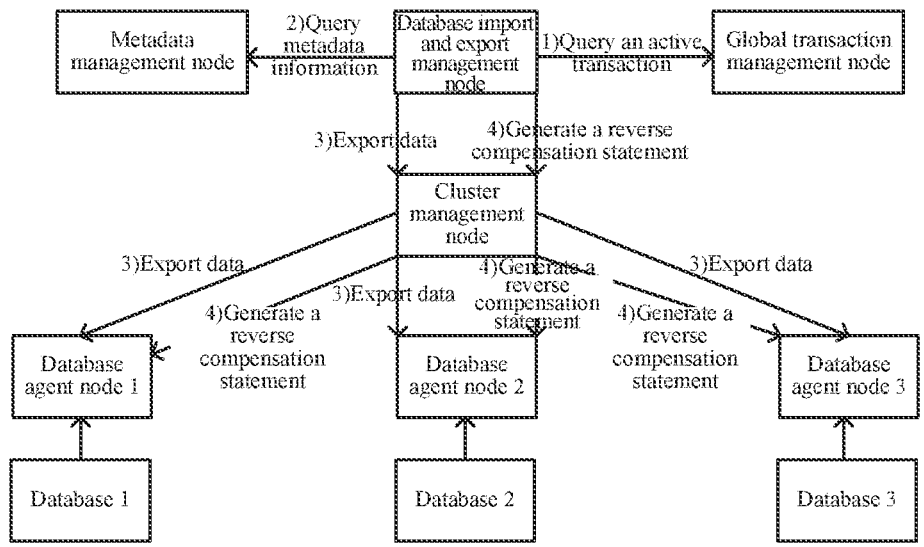
FIG. 6 is a flowchart of a single table data export according to a specific embodiment two of the present disclosure.

This specific embodiment provides a data export method based on a MySQL distributed database. The method is based on a process where data in a certain table needs to be exported for logical backup in an application of a distributed database system. In this specific embodiment, a flowchart of a single table data export shown in FIG. 6 is used as an example for description. As shown in FIG. 6, operations are described below.

In implementation details of the scheme, it is assumed that a business needs to export an order table from the distributed database system for the logical backup.

In this data export, a database import and export management node requests an active transaction list from a global transaction management node and stores the active transaction list in a memory.

After receiving a success response returned by the global transaction management node, the database import and export management node parses a response message and stores the response message in the memory, and the database import and export management node begins to request metadata information of an export table from a metadata management node (corresponding to the metadata management of the distributed database described above).

After receiving a success response from the metadata management node, the database import and export management node parses the response to obtain database nodes involved in the table.

The database import and export management node sends a data export request to each data node through a cluster manager to request each node to export data. A specific command is select . . . from . . . into outfile . . . .

After receiving a data export success request returned by each node, the database import and export management node sends the active transaction list to each database node through the cluster manager. The active transaction list includes active transaction details enumeration and a maximum active transaction ID. A database agent generates a reverse compensation statement (a standard SQL statement) in conjunction with a binary log and the active transaction list after receiving the active transaction list.

After receiving a reverse compensation statement generation success request, the database import and export management node sends a file processing request to each related node through the cluster manager to request each node to upload a reverse compensation statement file and an export data file to the database import and export management node.

After receiving a file upload success request, the database import and export management node combines export data files of all nodes into an export data file and combines the reverse compensation statement files into a data consistency reverse compensation statement file. After the combination, a data export success is returned and an export-related result file is returned to a client.

Specific Embodiment Three

Figure 7:
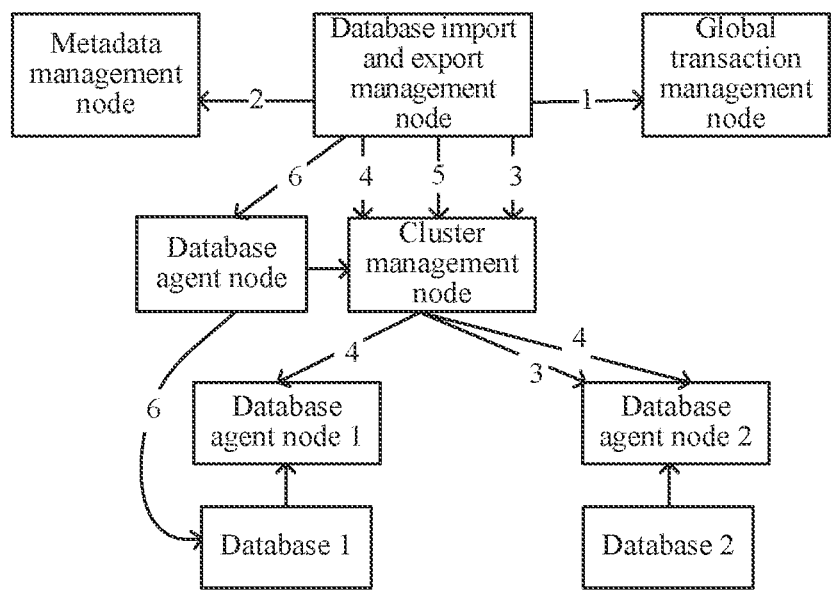
FIG. 7 is a flowchart in which a host is recovered from a latency node according to a specific embodiment three of the present disclosure.

This specific embodiment provides a data misoperation recovery method based on a MariaDB distributed database. Since the MariaDB database does not support a misoperation recovery scenario, in response to the misoperation of table data or even a table deletion in an online database maintenance process, data needs to be exported from a latency synchronization node to recover the table data. A flowchart in which a host is recovered from a latency node shown in FIG. 7 is used as an example. In FIG. 7, (1) denotes querying an active transaction, (2) denotes querying metadata information, (3) denotes exporting a statement, (4) denotes generating a reverse compensation statement, (5)

denotes importing the statement and (6) denotes executing the reverse compensation statement. Operations are described below.

In this data recovery process, a database import and export management node requests an active transaction list from a global transaction management node and stores the active transaction list in a memory.

After receiving a success response returned by the global transaction management node, the database import and export management node parses a response message and stores it in the memory, and the database import and export management node begins to request the metadata information of an export table from a metadata management node.

After receiving a success response from the metadata management node, the database import and export management node parses the response to obtain database nodes involved in the table.

The database import and export management node sends a data export request to a specified data node through a cluster manager to request the specified node to export data and upload the data to the database import and export management node. A specific command may be select . . . from . . . into outfile . . . .

To recover the table data, after receiving a data upload success response, the database import and export management node imports an exported data file into a database node with the table data to be recovered and notifies a database agent to recover the data to a position before the table data is deleted according to a current binary log generated by the host.

Finally, a distributed database agent performs active transaction reverse compensation for the distributed database according to transactions, and when two actions are completed, the table is recovered successfully.

Specific Embodiment Four

Figure 8:
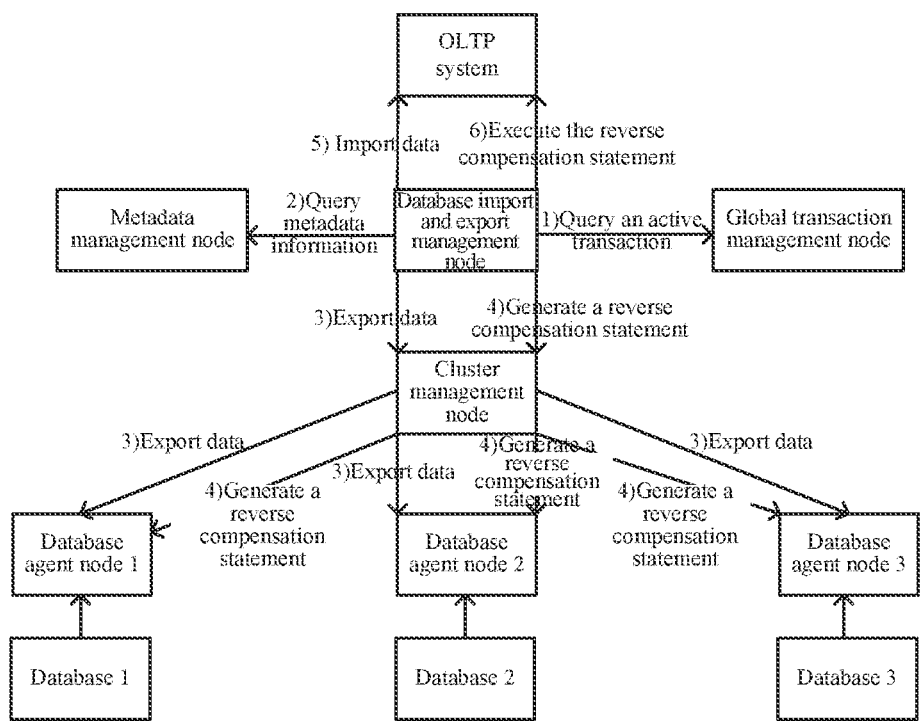
FIG. 8 is a flowchart of migration of incremental data according to a specific embodiment four of the present disclosure.

This specific embodiment provides an incremental data extraction method based on data in a Percona distributed database. In this association system, there are an online transaction processing (OLTP) system and an online analytical processing (OLAP) system. In this case, biographical data for the incremental data needs to be extracted from the OLTP system into the OLAP system periodically every day, and data analytical processing is performed in the OLAP system. In this task, a last modification time field needs to be added in each table to identify the incremental data. A biographical table records all data change biographies in an online table, and the business only has an insertion operation on the table. FIG. 8 is a flowchart of migration of incremental data extracted based on incremental data of data in a Percona distributed database according to a specific embodiment four of the present disclosure. As shown in FIG. 8, operations are described below.

Each time a database import and export management node receives an incremental data extraction request, the database import and export management node requests a current active transaction and a current maximum active transaction number from a global transaction management node.

After receiving a success response from the global transaction management node, the database import and export management node sends a request for acquiring metadata information of the biographical table to a metadata management node.

After receiving a success response, the database import and export management node reads time of a GTID executed first in an export on a previous day from a result file (if there is no result file, all data is exported), generates an export statement (similar to select * from dbtest.tbtest where itimestamp >'2017-05-11 00:00:00' into outfile 'test.txt'), and sends the export statement to a cluster manager for execution.

After receiving an export data response, the cluster manager forwards an export command to each related database agent.

After receiving a request, the database agent is connected to a database for the export command to be executed and feeds a result back to the cluster manager.

After receiving a data export success request fed back by each node, the database import and export management node sends an active transaction list to each database agent node through the cluster manager. The active transaction list includes active transaction enumeration and a maximum active transaction ID. The database agent generates a reverse compensation statement in conjunction with a binary log and the active transaction list after receiving the active transaction list and feeds back starting time of a minimum GTID of the database.

After receiving a response that a reverse compensation file is successfully generated, the database import and export management node sends a file processing request to each agent node through the cluster manager, and the database agent uploads a database export file and a reverse compensation statement file to the database import and export management node and returns a success response.

After receiving the success response, the database import and export management node combines data files into one data file and combines the reverse compensation files into one file.

After combination, the database import and export management node is connected to the OLAP system to import the incremental data into the OLAP system. After the incremental data is imported, the reverse compensation statement is sent to the OLAP system to be executed.

After the reverse compensation statement is executed, a database import and export management tool stores time of the minimum GTID executed this time in the result file. The incremental data extraction is completed.

Specific Embodiment Five

As shown in FIG. 7, a flowchart of a multi-table data export for a distributed database is provided in this embodiment.

Figure 9:
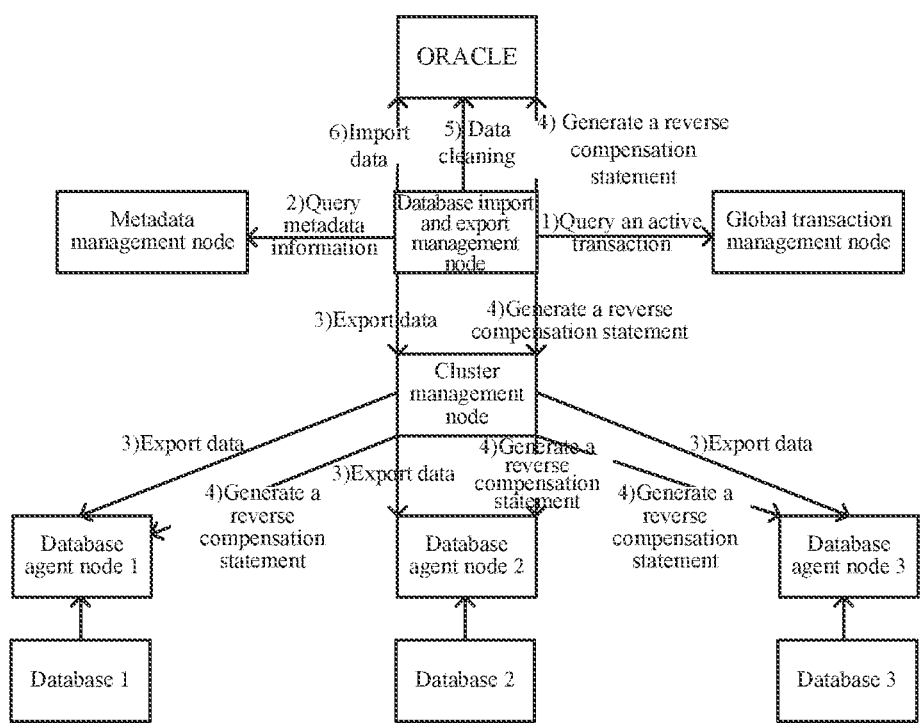
FIG. 9 is a flowchart of a multi-table data export according to a specific embodiment five of the present disclosure.

This specific embodiment provides a multi-table data export method for the distributed database, where the distributed database needs to be migrated to a backup database. Taking Oracle as an example, data needs to be exported from the distributed database and imported into an Oracle database. As shown in FIG. 9, the method includes steps described below.

After receiving a data migration task, a database import and export management node requests a current active transaction and a current maximum active transaction number from a global transaction management node.

After receiving a success response returned by the global transaction management node, the database import and export management node parses a response message and stores it in a memory, and the database import and export management node begins to request metadata information of all tables from a metadata management node.

After receiving a success response from the metadata management node, the database import and export management node parses the response to obtain database nodes involved in all the tables and sends a data export request to each node.

After the cluster manager receives the data export request, the cluster manager forwards an export command to each related database agent.

After receiving a request, the database agent is connected to the database for the export command to be executed and feeds a result back to the cluster manager.

After receiving a data export success request fed back by each node, the database import and export management node sends an active transaction list to each database agent node through the cluster manager. The active transaction list includes active transaction enumeration and a maximum active transaction ID. The database agent generates a reverse compensation statement in conjunction with a binary log and the active transaction list after receiving the active transaction list.

After receiving a data export success response, the database import and export management node sends a file upload request to each data agent through the cluster manager.

After receiving the file upload request, the database agent uploads a data file and a reverse compensation statement file to the database import and export management node and returns a success response.

After receiving the file upload success response, the database import and export management node combines data files according to the tables and combines reverse compensation statement files. After combination, the database import and export management node is connected to an OLAP system and import the data files into the Oracle database according to the tables.

After an import command has been executed, consistency reverse compensation files begin to be executed. After an execution success, the data migration is completed.

In an optional embodiment, a database import and export node is further provided. The database import and export node includes a processor. The processor is configured to perform operations described below. After receiving an export request for exporting data from a distributed database, the processor acquires an active transaction list and export table distribution information at a current moment. The active transaction list is used for identifying a completion degree of a current data import and export operation, and the export table distribution information is used for identifying a database that needs to export the data. The processor notifies, according to the export table distribution information, the corresponding database that the corresponding database performs a data export operation. After determining that the corresponding database completes the data export operation, the processor sends the active transaction list to a database agent node of the corresponding database to instruct the database agent node to generate a data consistency reverse compensation statement according to the active transaction list and a current log of the corresponding database. After receiving the data consistency reverse compensation statement returned by the database agent node, the processor imports the data exported by the corresponding database into a predetermined database and instruct the predetermined database to execute the data consistency reverse compensation statement.

In an optional embodiment, the processor is further configured to store the data exported by the corresponding database in a predetermined position after the processor notifies, according to the export table distribution information, the corresponding database that the corresponding database performs the data export operation. The predetermined position includes at least one of: the corresponding database or a server where the database import and export management node is located.

In an optional embodiment, the processor is further configured to store the data consistency reverse compensation statement in the predetermined position after the processor receives the data consistency reverse compensation statement returned by the database agent node. The predetermined position includes at least one of: the corresponding database or the server where the database import and export management node is located.

It is to be noted that operations performed by the specific processor are similar to operations executed by various modules in the data processing device for the distributed database described above, and details may refer to the embodiments described above and will not be repeated here.

An embodiment of the present disclosure further provides a storage medium. The storage medium includes stored programs where, when executed, the programs are configured to execute the method according to any one of the embodiments described above.

Optionally, in this embodiment, the storage medium may include, but is not limited to, a USB flash disk, a read-only memory (ROM), a random access memory (RAM), a mobile hard disk, a magnetic disk, an optical disk or another medium capable of storing program codes.

An embodiment of the present disclosure further provides an electronic device including a memory, a processor and computer programs stored in the memory and executable by the processor, where the processor is configured to execute the computer programs to execute the method according to any one of the embodiments described above. The processor in this embodiment and the processor in the database import and export management node described above may be different processors. Optionally, for specific examples in this embodiment, reference may be made to the examples described in the above-mentioned embodiments and optional embodiments, and repetition will not be made in this embodiment.

According to the embodiments described above, the problem in the related art can be solved, the online business of the distributed database does not need to be interrupted in the data export, the long transaction scenario is supported, a large number of I/Os of the database agent are not occupied. The embodiments of the present disclosure can separate the exported data stream from a normal business data stream of the distributed database, thereby improving the performance of the distributed database. Specifically, achieved effects are described below.

(1) The whole import and export process is performed online without interrupting the business. (2) A target node of the data export is flexibly selected, a data export from a backup machine is supported, the data stream and an online business data stream are independent when data is exported, and the data export has little influence on performance of the online business. (3) Data consistency based on the distributed transactions may be achieved. (4) An export file storage manner is flexible, storage in the database node or the database import and export management node is supported, and when they are stored in the import and export management node, whether the export files need to be classified and combined may be specified. (5) specifying a node to export data is supported.

Apparently, it should be understood by those skilled in the art that each of the above-mentioned modules or steps of the present disclosure may be implemented by a general-purpose computing device, the modules or steps may be concentrated on a single computing device or distributed on a network composed of multiple computing devices, and alternatively, the modules or steps may be implemented by program codes executable by the computing devices, so that the modules or steps may be stored in a storage device and executed by the computing device. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure. For those skilled in the art, the present disclosure may have various modifications and variations. Any modifications, equivalent substitutions, improvements and the like made within the principle of the present disclosure should fall within the scope of the present disclosure.

What is claimed is:

1. A data processing method for a distributed database, comprising:
after receiving an export request for exporting data from the distributed database, acquiring, by a database import and export management node, an active transaction list and export table distribution information at a current moment, wherein the active transaction list is used for identifying a completion degree of a current data import and export operation, and the export table distribution information is used for identifying a database that needs to export the data;
notifying, by the database import and export management node, the corresponding database that the corresponding database performs a data export operation according to the export table distribution information;
after determining that the corresponding database completes the data export operation, sending, by the database import and export management node, the active transaction list to a database agent node of the corresponding database to instruct the database agent node to generate a data consistency reverse compensation statement according to the active transaction list and a current log of the corresponding database; and
after receiving the data consistency reverse compensation statement returned by the database agent node, importing, by the database import and export management node, the data exported by the corresponding database into a predetermined database and instructing the predetermined database to execute the data consistency reverse compensation statement.

2. The method of claim 1, wherein after notifying, by the database import and export management node, the corresponding database that the corresponding database performs the data export operation according to the export table distribution information, the method further comprises:
storing, by the database import and export management node, the data exported by the corresponding database in a predetermined position, wherein the predetermined position comprises at least one of:
the corresponding database; or
a server where the database import and export management node is located.

3. The method of claim 2, wherein storing, by the database import and export management node, the data exported by the corresponding database in the server where the database import and export management node is located comprises:
combining, by the database import and export management node, the exported data to obtain first combined data, and
storing, by the database import and export management node, the first combined data in the server where the database import and export management node is located.

4. The method of claim 1, wherein after receiving, by the database import and export management node, the data consistency reverse compensation statement returned by the database agent node, the method further comprises:
storing, by the database import and export management node, the data consistency reverse compensation statement in a predetermined position, wherein the predetermined position comprises at least one of:
the corresponding database; or
a server where the database import and export management node is located.

5. The method of claim 4, wherein storing, by the database import and export management node, the data consistency reverse compensation statement in the server where the database import and export management node is located comprises:
combining, by the database import and export management node, data consistency reverse compensation statement to obtain second combined data, and
storing, by the database import and export management node, the second combined data in the server where the database import and export management node is located.

6. The method of claim 1, wherein notifying, by the database import and export management node, the corresponding database that the corresponding database performs the data export operation according to the export table distribution information comprises:
sending, by the database import and export management node according to the export table distribution information, a data export message to a cluster manager to instruct the cluster manager to notify the corresponding database that the corresponding database performs the data export operation.

7. The method of claim 1, wherein sending, by the database import and export management node, the active transaction list to the database agent node of the corresponding database comprises:
sending, by the database import and export management node, the active transaction list to the database agent node of the corresponding database through a cluster manager.

8. An electronic device, comprising a memory and a processor, wherein the memory is configured to store computer programs and the processor is configured to execute the computer programs to execute the method of claim 1.

9. A database import and export management node, comprising: a processor, wherein the processor is configured to:
after receiving an export request for exporting data from a distributed database, acquire an active transaction list and export table distribution information at a current moment, wherein the active transaction list is used for identifying a completion degree of a current data import and export operation, and the export table distribution information is used for identifying a database that needs to export the data;

notify, according to the export table distribution information, the corresponding database that the corresponding database performs a data export operation;

after determining that the corresponding database completes the data export operation, send the active transaction list to a database agent node of the corresponding database to instruct the database agent node to generates a data consistency reverse compensation statement according to the active transaction list and a current log of the corresponding database; and after receiving the data consistency reverse compensation statement returned by the database agent node, import the data exported by the corresponding database into a predetermined database and instruct the predetermined database to execute the data consistency reverse compensation statement.

10. The database import and export management node of claim 9, wherein the processor is further configured to:

after notifying, according to the export table distribution information, the corresponding database that the corresponding database performs the data export operation, store the data exported by the corresponding database in a predetermined position, wherein the predetermined position comprises at least one of:

the corresponding database; or a server where the database import and export management node is located.

11. The database import and export management node of claim 10, wherein the processor is configured to store the data exported by the corresponding database in the server where the database import and export management node is located by:

combining the exported data to obtain first combined data, and storing the first combined data in the server where the database import and export management node is located.

12. The database import and export management node of claim 9, wherein the processor is further configured to:

after receiving the data consistency reverse compensation statement returned by the database agent node, store the data consistency reverse compensation statement in a predetermined position, wherein the predetermined position comprises at least one of:

the corresponding database; or a server where the database import and export management node is located.

13. The database import and export management node of claim 12, wherein the processor is configured to store the data consistency reverse compensation statement in the server where the database import and export management node is located by:

combining data consistency reverse compensation statement to obtain second combined data, and storing the second combined data in the server where the database import and export management node is located.

14. The database import and export management node of claim 9, wherein the processor is configured to notify the corresponding database that the corresponding database performs the data export operation according to the export table distribution information by:

sending, according to the export table distribution information, a data export message to a cluster manager to instruct the cluster manager to notify the corresponding database that the corresponding database performs the data export operation.

15. The database import and export management node of claim 9, wherein the processor is configured to send the active transaction list to the database agent node of the corresponding database by:

sending the active transaction list to the database agent node of the corresponding database through a cluster manager.

16. A non-transitory storage medium, which is configured to store computer programs, wherein when executed, the computer programs are configured to execute the following steps:

after receiving an export request for exporting data from the distributed database, acquiring an active transaction list and export table distribution information at a current moment, wherein the active transaction list is used for identifying a completion degree of a current data import and export operation, and the export table distribution information is used for identifying a database that needs to export the data;

notifying the corresponding database that the corresponding database performs a data export operation according to the export table distribution information;

after determining that the corresponding database completes the data export operation, sending the active transaction list to a database agent node of the corresponding database to instruct the database agent node to generate a data consistency reverse compensation statement according to the active transaction list and a current log of the corresponding database; and after receiving the data consistency reverse compensation statement returned by the database agent node, importing the data exported by the corresponding database into a predetermined database and instructing the predetermined database to execute the data consistency reverse compensation statement.

* * * * *